United States Patent
Sunahara et al.

(10) Patent No.: US 12,476,014 B1
(45) Date of Patent: Nov. 18, 2025

(54) REDUCED NEUTRON EMISSION TARGET FOR FUSION ENERGY GENERATION

(71) Applicant: Blue Laser Fusion, Inc., Palo Alto, CA (US)

(72) Inventors: Atsushi Sunahara, Palo Alto, CA (US); Shuji Nakamura, Palo Alto, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 0 days.

(21) Appl. No.: 18/792,371

(22) Filed: Aug. 1, 2024

(51) Int. Cl.
*G21B 1/19* (2006.01)
*G21B 1/05* (2006.01)

(52) U.S. Cl.
CPC ........ *G21B 1/19* (2013.01); *G21B 1/05* (2013.01)

(58) Field of Classification Search
CPC .................................. G21B 1/19; G21B 1/05
USPC .......................................................... 376/152
See application file for complete search history.

(56) References Cited

U.S. PATENT DOCUMENTS

| | | |
|---|---|---|
| 5,168,400 A | 12/1992 | Moses |
| 8,208,508 B2 | 6/2012 | Deri et al. |
| 9,171,646 B2 | 10/2015 | Moses et al. |
| 10,410,752 B2 | 9/2019 | Hora |
| 10,476,226 B2 | 11/2019 | Bayramian et al. |

(Continued)

FOREIGN PATENT DOCUMENTS

| | | | |
|---|---|---|---|
| WO | WO1996036969 A1 | * | 11/1996 |
| WO | 2011029031 A1 | | 3/2011 |

(Continued)

OTHER PUBLICATIONS

Peter Russbueldt et al., "Innoslab Amplifiers", IEEE Journal of Selected Topics in Quantum Electronics, Jan./Feb. 2015, vol. 21, No. 1, pp. 447-463, Art No. 3100117, doi: 10.1109/JSTQE.2014.2333234.

(Continued)

*Primary Examiner* — Jack W Keith
*Assistant Examiner* — Daniel Wasil
(74) *Attorney, Agent, or Firm* — Richard T. Ogawa; Ogawa P.C.

(57) ABSTRACT

A fuel target device for an inertial confinement fusion process. The device comprises a center region is comprising a first fuel layer of deuterium-tritium-lithium ($(DT)_{(1-x)}Li_x$, $0<x<0.5$) fuel characterized by a higher or equal ignition temperature in comparison with a lowest ignition temperature of deuterium-tritium (DT). The device comprises a second fuel layer of deuterium-tritium (DT) fuel characterized by the lowest ignition temperature is surrounding the center region, and a third fuel layer comprising an outer region of a pure hydrogen ($H_2$) or a proton rich boron ($p_yB_{(1-y)}^{11}$, $1>y>0.5$) material is surrounding the deuterium-tritium (DT) fuel such that the deuterium-tritium (DT) fuel is sandwiched between the deuterium-tritium-lithium ($(DT)_{(1-x)}Li_x$, $0<x<0.5$) fuel and the pure hydrogen or proton rich boron ($p_yB_{(1-y)}^{11}$, $1>y>0.5$) material.

10 Claims, 8 Drawing Sheets

(56) References Cited

U.S. PATENT DOCUMENTS

| | | | |
|---|---|---|---|
| 10,660,192 | B2 | 5/2020 | Campbell et al. |
| 11,387,007 | B2 | 7/2022 | Moses et al. |
| 2003/0002610 | A1 | 1/2003 | Panarella |
| 2009/0000268 | A1 | 1/2009 | Yurash |
| 2011/0091000 | A1* | 4/2011 | Stubbers .................. G21B 1/19 |
| | | | 376/109 |
| 2011/0235669 | A1 | 9/2011 | Deri et al. |
| 2011/0261919 | A1 | 10/2011 | Sefcik et al. |
| 2013/0064340 | A1 | 3/2013 | Latkowski et al. |
| 2014/0138359 | A1 | 5/2014 | Carr et al. |
| 2014/0348283 | A1 | 11/2014 | Perkins et al. |
| 2018/0211732 | A1 | 7/2018 | Perkins |
| 2024/0379250 | A1* | 11/2024 | Mehlhorn ................ G21B 1/19 |

FOREIGN PATENT DOCUMENTS

| | | |
|---|---|---|
| WO | 2012064767 A1 | 5/2012 |
| WO | 2013070683 A1 | 5/2013 |
| WO | 2013133885 A1 | 9/2013 |
| WO | 2013165469 A2 | 11/2013 |
| WO | 2014113100 A2 | 7/2014 |
| WO | 2014130127 A2 | 8/2014 |
| WO | 2014160128 A1 | 10/2014 |
| WO | 2015021403 A1 | 2/2015 |

OTHER PUBLICATIONS

Y. Hosaka et al., "Mode-locked pulse oscillation of a self-resonating enhancement optical cavity" Journal of Physics: Conference Series. 1350. 10.1088/1742-6596/1350/1/012028, Oct. 2016.

\* cited by examiner

REDUCED NEUTRON EMISSION TARGET FOR FUSION ENERGY GENERATION

BACKGROUND OF INVENTION

This invention generally relates to nuclear fusion energy technologies. Specifically, it provides systems and methods for nuclear fusion energy using ultra-intensity pulsed laser systems and associated technologies. More specifically, this invention provides a novel target for fusion energy. As an example, the invention can be applied to various uses including energy generation for power, spacecraft, vehicles for air, land, and sea travel, and defense applications such as satellites, aerospace, terrestrial, and missile defense systems, submarines, boats, as well as in fields like biotechnology, chemistry, mechanical, electrical, communications, and data applications.

In conventional inertial confinement fusion (ICF), high-intensity lasers or particle beams irradiate a small pellet of nuclear fusion fuel to compress, heat it, and then initiate thermonuclear fusion ignition and burn, resulting in extracting energy released by the nuclear fusion reaction. In December 2022, laser fusion ignition using DT (deuterium tritium) fuel was achieved at the National Ignition Facility (NIF), demonstrating energy gain for the first time globally. This historical achievement has increasingly attracted attention to the realization of nuclear fusion power generation, especially laser fusion reactors. Most nuclear fusion research and development including the NIF around the world have focused on the DT reaction (D+T→neutron+ $He^4$) using deuterium (D) and tritium (T) as a fusion fuel. This is because the DT reaction has the lowest nuclear fusion ignition temperature among many fusion reactions, making it the desirable way to achieve fusion ignition and burn.

However, the DT fusion reaction generates high-energy neutrons of 14.1 MeV. These neutrons can significantly damage the reactor wall and surrounding equipment. Neutron damage shortens the lifespan of reactor chambers and other surrounding equipment. Additionally, the energetic neutron-irradiated reactor chamber becomes radioactive, continually emitting radiation, making it difficult for humans to access the reactor system during maintenance. Furthermore, once the reactor is decommissioned, the radioactive chamber should be safely managed as waste for many years. This waste issue is already a problem with current fission reactors and poses a large societal challenge. Although fusion reactors do not produce as high-level waste as fission reactors, neutron generation during nuclear fusion reactions can significantly restrict the design, operation, and decommissioning of fusion reactor systems.

On the other hand, the $pB^{11}$ reaction (p+$B^{11}$→3$He^4$) is a nearly neutron-free fusion that can significantly alleviate the problems associated with neutrons in DT fusion, potentially realizing fusion reactors with higher social acceptability. However, the $pB^{11}$ reaction has a difficulty of a high ignition temperature which is orders of magnitude higher than DT fuel, and resultantly, it is difficult to initiate the thermonuclear ignition and burn of $pB^{11}$ fuel.

SUMMARY OF INVENTION

According to the present invention, techniques generally relate to nuclear fusion energy technologies are included. Specifically, it provides systems and methods for nuclear fusion energy using ultra-intensity pulsed laser systems and associated technologies. More specifically, this invention provides a novel target for fusion energy. As an example, the invention can be applied to various uses including energy generation for power, spacecraft, vehicles for air, land, and sea travel, and defense applications such as satellites, aerospace, terrestrial, and missile defense systems, submarines, boats, as well as in fields like biotechnology, chemistry, mechanical, electrical, communications, and data applications.

In an example, the present invention provides a fuel target device, in an example, for an inertial confinement fusion process, among others, e.g., magnetic. In an example, the device has a center region comprising a deuterium and tritium (DT) containing fuel. The device has a deuterium-tritium-lithium ($(DT)_{(1-x)}Li_x$, 0≤x<0.5) containing fuel surrounding the center region and a pure hydrogen ($H_2$) or a proton rich boron ($p_yB_{(1-y)}^{11}$, 1≥y>0.5) containing material surrounding the deuterium-tritium-lithium containing fuel. As used herein, the term "pure" means substantially all or up to a practical percentage of purity, e.g., 99.9%, 99.99%, 99.999%, 99.9999%.

In an example, the present invention provides an alternative fuel target device for an inertial confinement fusion process, among others. In an example, the device has a center region is comprising a deuterium-tritium-lithium ($(DT)_{(1-x)}Li_x$, 0≤x<0.5) fuel characterized by a higher or equal ignition temperature in comparison with a lowest ignition temperature of deuterium-tritium (DT). The device has a second fuel of deuterium-tritium (DT) fuel characterized by the lowest ignition temperature is surrounding the center fuel and a third outer region of a pure hydrogen ($H_2$) or proton rich boron ($p_yB_{(1-y)}^{11}$, 1≥y>0.5) material is surrounding the deuterium-tritium (DT) fuel such that the deuterium-tritium (DT) fuel is sandwiched between the deuterium-tritium-lithium ($(DT)_{(1-x)}Li_x$, 0≤x<0.5) fuel and the pure hydrogen or proton rich boron ($p_yB_{(1-y)}^{11}$, 1≥y>0.5) material.

In an example, the present invention provides a method for generating energy using a target for inertial confinement fusion (ICF). The method includes irradiating a target comprising an outer region of a pure hydrogen and the ablation material with a nanosecond laser pulse to compress the target and irradiating the compressed target with a sub-nanosecond, picosecond, or femtosecond laser pulse to ignite the DT plasma such that a neutron flux with an energy of 14.1 MeV generated by a deuterium or tritium fusion is converted into a proton flow by the outer region of protons (hydrogens), reducing an neutron energy.

In an example, placing a $pB^{10\&11}$ layer with a hydrogen or increased proton fraction on the outside of the DT or $DTLi^{6\&7}$ layer causes neutrons generated in the DT reaction to be slowed down and converted into a proton flow. In an example the aforementioned results in a high fusion gain target with a target gain of 100, which is necessary for power generation, while at the same time significantly reducing the number of neutrons generated from the target. This present invention reduces neutron damage in laser fusion power reactor systems and reduces the problem of activation, making maintenance easier and easier to handle after decommissioning, and enabling the construction of a sustainable laser fusion power generation system with high social acceptability.

Depending upon the example, the present invention can achieve one or more of these benefits and/or advantages. In an example, the present invention provides a fusion energy system including a high intensity pulse or continuous wave (CW) laser system configured with a reactor in a compact and spatially efficient system and related methods. In an example, the high intensity pulse or CW laser system provides enough energy to ignite and sustain fusion energy within the reactor. In an example, the present invention offers advantages of generating fusion power through an efficient size, weight, and cost using the present high intensity lasers. In an example, the present techniques provide for improved implosion and ignition of a target. In an example, the target has a mixture that reduces generation of neutrons. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF EXAMPLES

Figure 1:
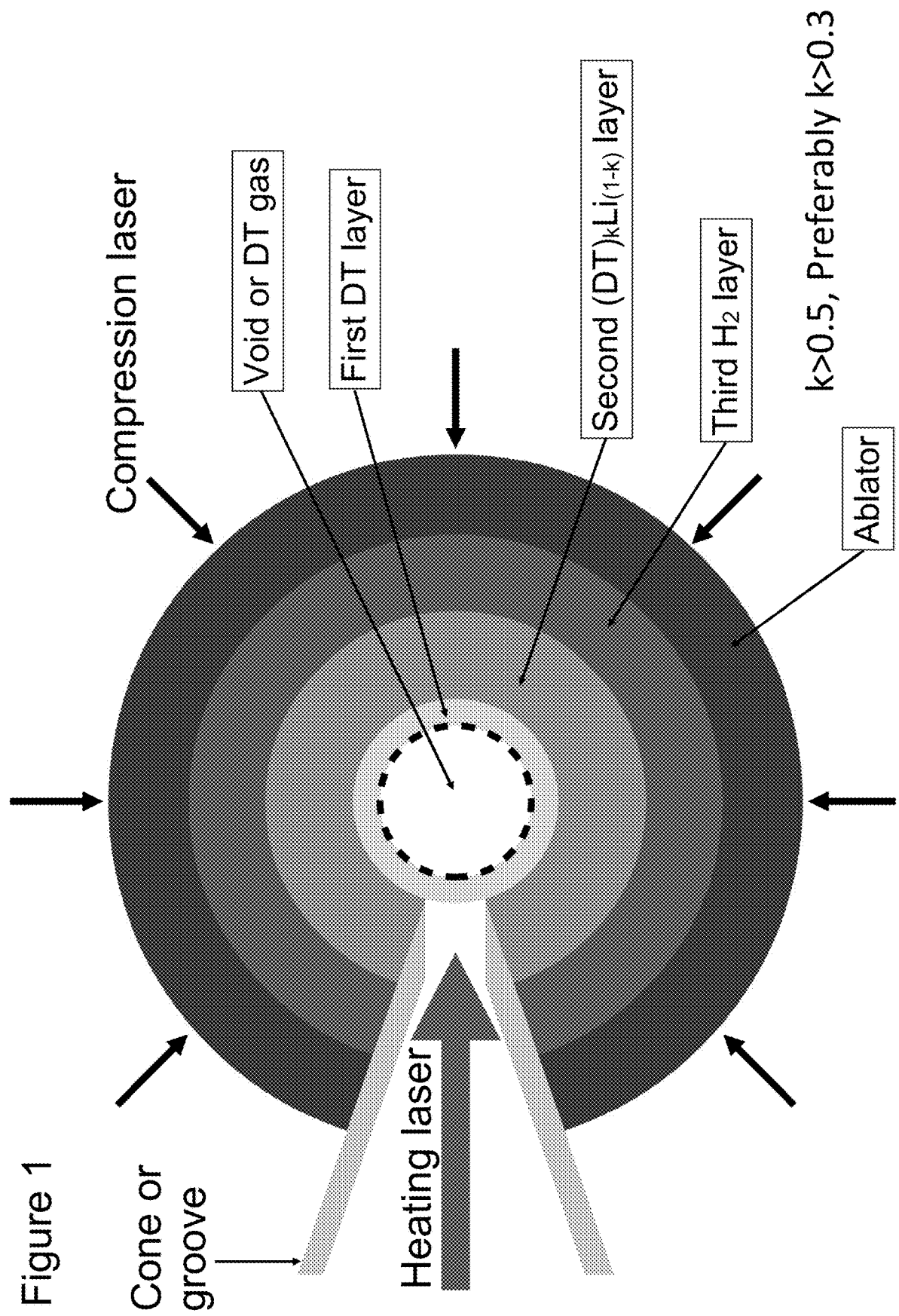
FIG. 1 is a simplified diagram illustrating a target used for inertial confinement fusion (ICF) including D (deuterium) T (tritium) at the center region of the target in an example of the present invention.

Conventionally, target materials for laser fusion have been made of single materials of binary compounds such as D (deuterium) T (tritium), D (deuterium) Helium³ (Helium), $Li^{6\&7}$ (lithium), and P (proton) $B^{10\&11}$ (boron). Here, $Li^{6\&7}$ (lithium) represents $Li^6$, $Li^7$, or natural Li including both $Li^6$ and $Li^7$. When a single material of DT is used as a target material, it produces high-energy neutrons that are harmful to any material. Also, T (tritium) is a radioactive material. An advantage of DT fuel is that it has the lowest ignition temperature around 5-10 keV. Because of its lowest ignition temperature, more than 90% of nuclear fusion companies and national laboratories currently use DT as a target. $He^3$ is a rare material, and it is difficult to procure on earth. When a single material of $DLi^{6\&7}$ is used as a target, it produces medium-energy neutrons, T, protons, and other particles. The number and energy of neutrons are much smaller than DT. The ignition temperature of $DLi^{6\&7}$ is an intermediate value of 66 keV, much higher than DT's 10 keV. Because of $DLi^{6\&7}$'s high ignition temperature, $DLi^{6\&7}$ is not desirable among laser fusion researchers as a target.

When a single material of $pB^{11}$ is used as a target, no neutrons are generated. $pB^{11}$ is one of the cleanest target materials of all kinds of target materials. However, the ignition temperature of $pB^{11}$ is the highest at 123 keV, which is much higher than DT's 13.6 keV and $DLi^{6\&7}$'s 66 keV. Because of its high ignition temperature, $pB^{11}$ targets are not desirable among scientists as target materials, even though they are the cleanest materials from the perspective of environmental issues.

DT is a gas phase at room temperature. For this reason, to make a solid DT layer as the target, DT should be cooled to extremely cryogenic low temperatures, which increases the target cost. To solve this problem, we have described a target material of LiDT (lithium deuterium tritium) that is solid at room temperature. LiDT is the material in which the hydrogen of LiH is replaced with DT. Also, by placing a layer of $PB^{11}$ on the outside of the LiDT target layer, we described a multilayer target structure that converts fast neutrons of 14.1 MeV flow into proton flow by slowing down the neutrons originating from the DT reaction and transferring their momentum to protons.

LIDT allows the solid state to be maintained at room temperature, but compared to DT, the radiation loss increases due to the amount of high atomic number atoms of Li contained, and as a result, the ignition temperature is higher than 10 keV for DT. Also, we describe low Li mole ratio of LIDT with the Li mole ratio less than 50% or 30% to reduce the loss caused by high atomic number of Li. To solve this problem, we describe a target structure that has a gaseous DT region as the initial ignition region. This target structure includes a DT fuel region as the initial state, but since it is gaseous at room temperature. Thus, our target structure is a solid target containing a gaseous DT at room temperature.

As a result of further optimizing the target design, we described a target structure that can effectively slow down neutrons and convert neutron flow to proton flow by increasing the proportion of protons or replacing it completely with $H_2$ for the $pB^{11}$ layer, which slows down neutrons generated in the DT reaction and converts neutron flow to proton flow.

In our target design, we have developed a $DTLi^{6\&7}$ layer that can remain solid even at room temperature to avoid the need for cryogenic cooling to extremely low temperature. The introduction of cryogenic temperatures carries the risk of increasing the target cost. If we replace the $pB^{11}$ layer completely with $H_2$, hydrogen is gas at room temperature, so it needs to be cooled to extremely low temperatures to create a solid $H_2$ region. Although the risk of the target cost increases, the introduction of the solid $H_2$ layer can effectively slow down neutrons and convert the neutron flow into a proton flow, which may outweigh the risk of increased cost.

Whether the final cost increases or decreases will depend on both the increase in target cost due to the introduction of cryogenic temperatures and the reduction in the cost of the target and the laser fusion reactor as a whole due to the suppression of the number of neutrons generated. If the number of neutrons emission from the target can be suppressed, neutron damage to the entire laser fusion reactor can be suppressed, leading to a longer life of the reactor and lower maintenance costs. It also reduces the problem of activation of reactor materials by neutrons, not only making access easier for maintenance but also significantly facilitating waste management after decommissioning. These advantages enable us to realize a more socially acceptable and sustainable laser fusion reactor.

We aim to generate electricity through laser fusion, and a target gain of, e.g., 100, is desired to operate the power generation system. In other words, a fusion energy output of 100 times the input laser energy is desired. If the neutron flow generated by the DT reaction can be converted into a proton flow, which is a charged particle, it will be possible to directly generate electricity using the charged particles such as protons generated. This direct electricity generation enables us to realize higher effective energy conversion from fusion energy to electricity. This opens up the possibility of converting fusion energy into electricity more efficiently than in steam power generation, which involves capturing neutrons generated in conventional DT reactions with liquid metal, extracting the energy as heat to create steam, and using it to turn a turbine to generate electricity.

FIG. 1 is a simplified diagram illustrating a target used for inertial confinement fusion (ICF) in an example. D (deuterium) T (tritium) at the center region of the target in an example of the present invention. By surrounding the DT region, there is a second fuel of DTLi fuel and then a third layer of hydrogen $H_2$. Here, DTLi represents $DTLi^6$, $DTLi^7$, or DTLi including both $Li^6$ and $Li^7$. The outermost material is the ablator. If the liquid or solid DT phase is used for the first fuel layer, a void can exist at the center part of the target surrounded by the first DT fuel as an initial target condition. As used herein, the terms first, second, third, and others are not generally intended to describe a precise order in one or more examples.

The first DT layer can be a gas, liquid, or solid as the initial target condition. For the liquid phase of DT as the initial phase, the DT liquid layer can be mechanically supported by the low-density foam. The low-density foam can be used to support the liquid hydrogen. If solid-state DT is used as the first layer, there is no need to use low-density foam as it can hold its structure.

Similarly, if the liquid hydrogen is used as the third layer, the low-density foam can be used to support the liquid hydrogen. If solid-state $H_2$ is used as the third layer, there is no need to use low-density foam as it can hold its structure.

The second layer of DTLi is a solid phase at room temperature. The fraction of $Li^6$ and $Li^7$ can be changed to provide a better condition for fusion reactions of $DLi^6$ and $DLi^7$, but the usage of natural Lithium including both $Li^6$ and $Li^7$ is cost-effective from the target fabrication point of view. Li mole ratio of DTLi should be less than 50%, preferably less than 30% to minimize a radiation loss due to Li.

A cone-shaped groove or cone target made of metals is formed on a target. The tip of the cone-shaped groove or cone target is located near or inside the first fuel material of DT or the second fuel material of DTLi. The nanosecond pulse with a pulse width of 1 ns~40 ns and a total pulse power density of $1\times10^{13}$ W/cm$^2$~$1\times10^{18}$ W/cm$^2$ is irradiated into the target as a compression laser and then the target is compressed at least, e.g., 100 times to 20,000 times, by the laser ablation.

The sub-nanosecond, picosecond, or femtosecond laser light sources output a sub-nanosecond, picosecond, or femtosecond pulse focused on the first DT layer as a heating laser through the cone-shaped groove or cone-target on the target with a total peak pulsed power density of $1\times10^{17}$ W/cm$^2$~$1\times10^{24}$ W/cm$^2$. The heating laser light sources focus on a small laser spot size of 10 microns~50 microns on the first layer of DT. The target has a diameter of 1 mm~9 mm with a sphere shape. Thus, the cone-shaped groove or cone-target should be almost the same size or a little bit larger than the laser spot size.

The high-intensity sub-nanosecond, picosecond, or femtosecond laser light sources irradiate and ignite the DT directly and effectively through the groove with a low ignition temperature of around 10 keV as mentioned in FIG. 1. When there is no groove in the target, the high-intensity sub-nanosecond, picosecond, or femtosecond laser light cannot ignite the DT effectively by the second and third fuel layers of DTLi and $H_2$ preventing the high-intensity sub-nanosecond, picosecond, or femtosecond laser light to reach to the first fuel of DT. Once the DT region is ignited, then the DTLi layer is ignited at temperatures between 10 keV and 66 keV and generates high-energy charged particles and high-energy neutrons as the fusion energy output.

After the ignition of the DT or DTLi layer, protons in the third layer of $H_2$ collide with high-energy neutrons produced by the fusion reaction effectively, and the momentum energy is transferred from the high-energy neutrons to protons. When the high-energy neutrons lose the energy, protons gain their energy. By using our target configuration with $H_2$ layer, the generation of neutrons is minimized or reduced. In this case, cryogenic low temperature is desired to generate the solid phase of hydrogen because $H_2$ is a gas at room temperature. An alternative method of realizing the hydrogen layer is to use the low-density foam. By permeating the foam with liquid $H_2$, we can make a solid or liquid $H_2$ layer at the cryogenic low temperature. To use hydrogen $H_2$ as a third layer material can effectively slow down the fast neutrons originating from fusion reactions such as DT, DD, and DLi reactions in the third layer.

Placing the third layer of hydrogen around the second layer of DTLi solid fuel also has advantages in target fabrication. In conventional laser fusion targets, a solid DT layer cooled to cryogenic temperatures is mainly used as the fusion fuel layer. Even if you try to place a third layer of hydrogen, $H_2$, around this DT layer cooled to cryogenic temperatures, the second layer of DT and the third layer of $H_2$ are chemically both hydrogen with similar chemical properties, and their heat capacity and melting temperature are almost similar. Therefore, when the third layer of $H_2$ is cooled from a gas or liquid state to form a solid layer surrounding the cryogenically cooled DT solid layer, the already formed second layer of DT melts or vaporizes due to the heat of the third layer of $H_2$, and the second and third layers mix, making it difficult to build a sharp multilayer structure. In our target design, the second layer is DTLi, which is solid at room temperature and significantly different from hydrogen in its chemical properties, thermal properties, melting point, and boiling point. Therefore, when forming a third $H_2$ layer around DTLi in the second layer, the second layer remains in a solid state and does not melt and mix like DT. Thus, using DTLi in the second layer is also beneficial for forming a third $H_2$ layer.

Figure 2:
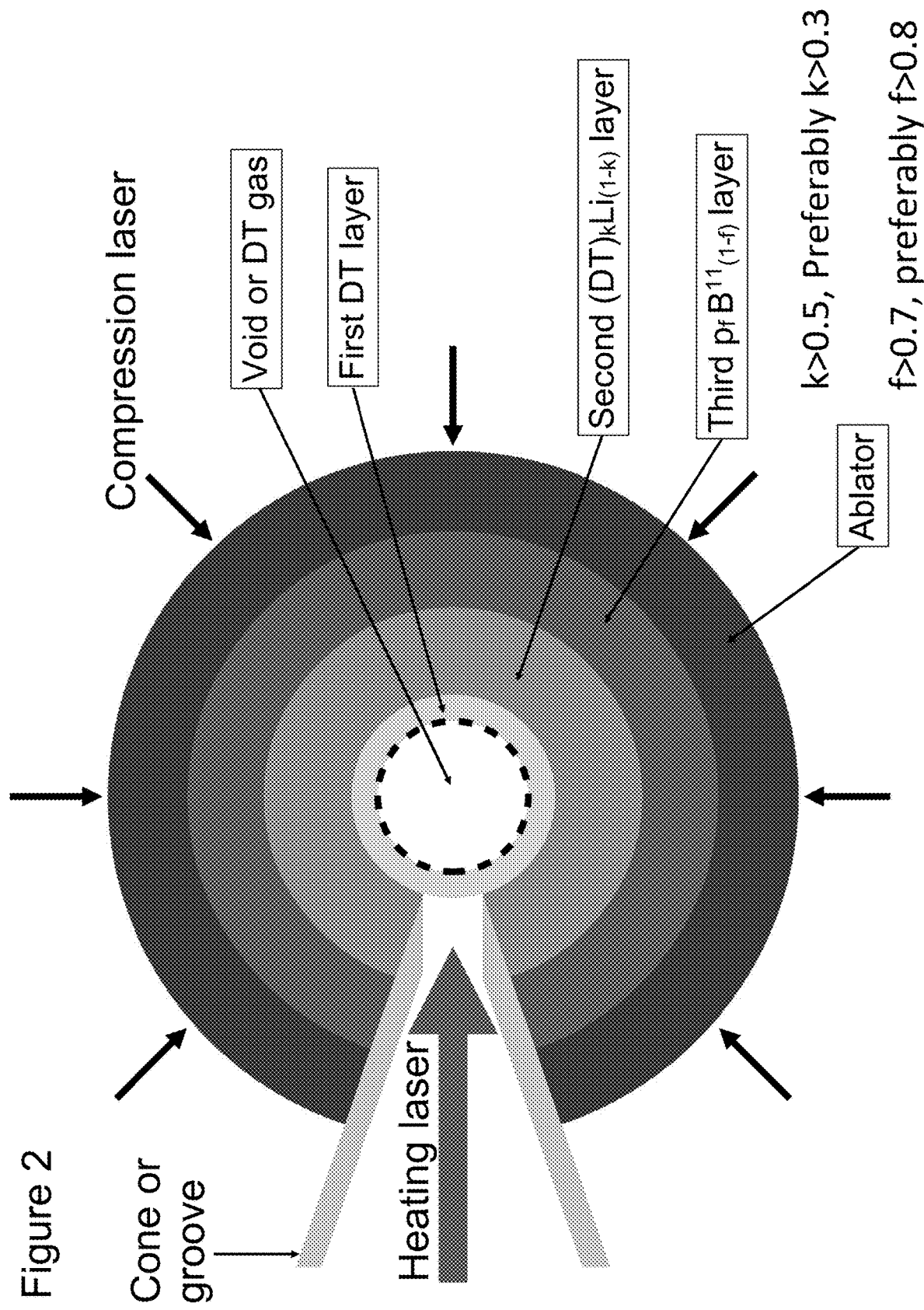
FIG. 2 is a simplified diagram illustrating an alternative target using proton-rich $pB^{11}$ without $H_2$ shown in FIG. 1 in an example of the present invention.

FIG. 2 shows the alternative to FIG. 1 where proton-rich $pB^{11}$ is used without $H_2$ shown in FIG. 1 in an example of the present invention. In this case, the hydrogen fraction is not 100% in the third layer, so the neutron slowing effect is reduced compared to when $H_2$ is used. However, $pB^{11}$ is a solid at room temperature, and $pB^{11}$ which is proton-enhanced by ion plantation, or other methods based on this $pB^{11}$ can remain solid phase at room temperature. Also, an increase in fusion power can be expected from the $pB^{11}$ fusion reaction. In the case of FIG. 2, these high-energy charged particles and high-energy neutrons caused by the DTLi ignition are used to ignite the third fuel of pB$^{11}$ which is surrounding the DTLi at the ignition temperature above 100 keV. Furthermore, the fraction of the proton of the pB$^{11}$ layer of the target is increased so as to relax the requirement for the ignition. The increased fraction of the protons in the pB$^{11}$ layer enables the pB$^{11}$ layer with lower ignition temperature because a larger fraction of Hydrogen (proton) with atomic number Z=1 emits less x-ray than Boron with atomic number Z=5. The proton-rich condition of pB$^{11}$ can be achieved by using decaborane ($H_{14}B_{10}$) or DT ion implantation into the pB$^{11}$ materials.

If we use the hydrogen $H_2$ as the layer material instead of proton-riched pB$^{11}$ in the third layer surrounding the first or second layers, the pB reaction will no longer occur. However, most of the fusion energy is released by the DT fusion reaction in the first layer of DT and the second layer of DTLi, the amount of the fusion energy production from pB$^{11}$ is relatively smaller than DT reaction, DD reaction, or others. Thus, the usage of hydrogen $H_2$ as the third layer material does not have much effect on fusion energy output. Rather, proton-rich fuel effectively slows down neutrons, facilitating target designs that suppress the number of 14.1 MeV fast neutrons produced in DT reactions while maintaining a high target gain of over 100 desired for the laser fusion reactor producing the electricity power.

Figure 3:
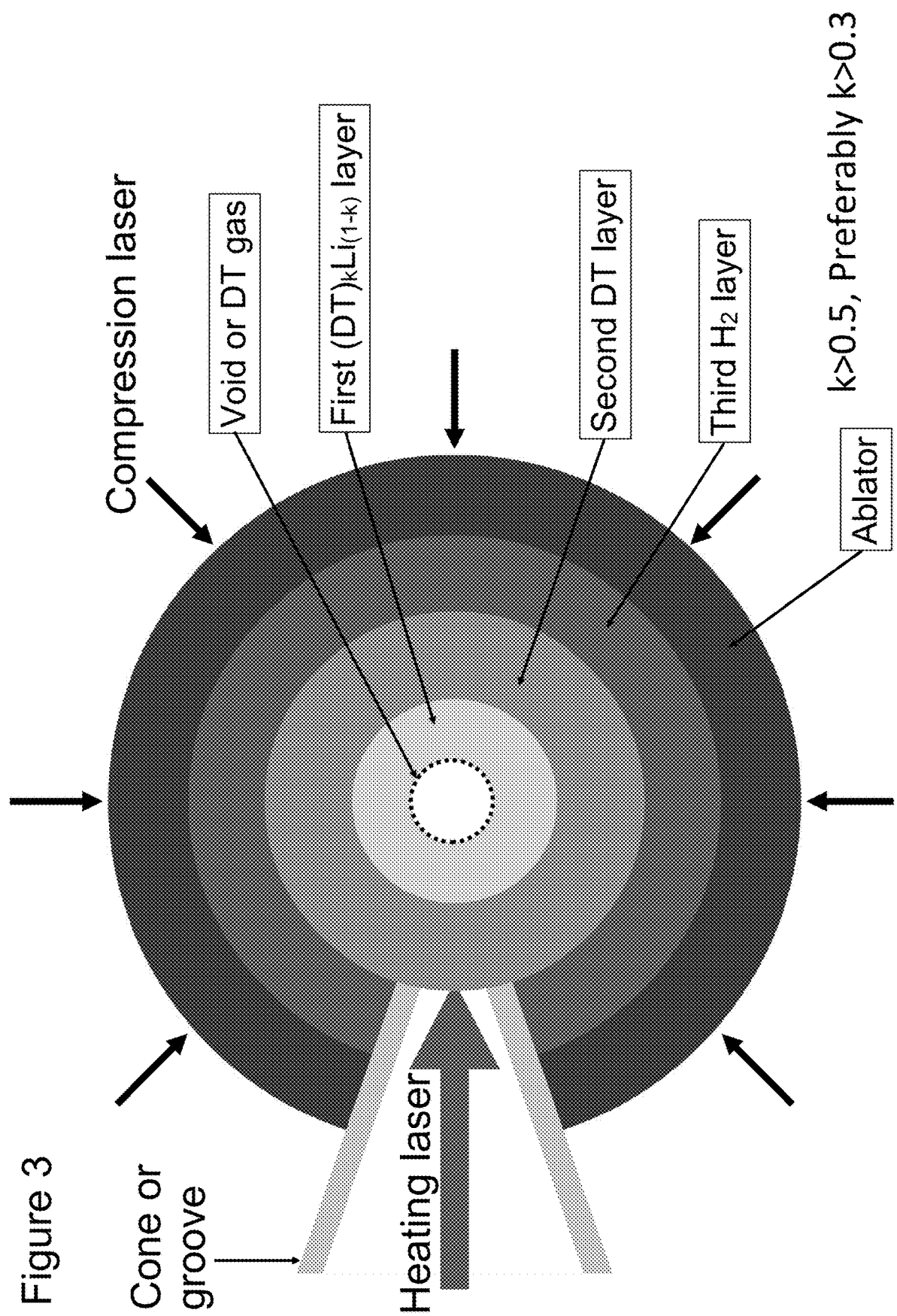
FIG. 3 is a simplified diagram illustrating an alternative target according to an example of the present invention.
Figure 4:
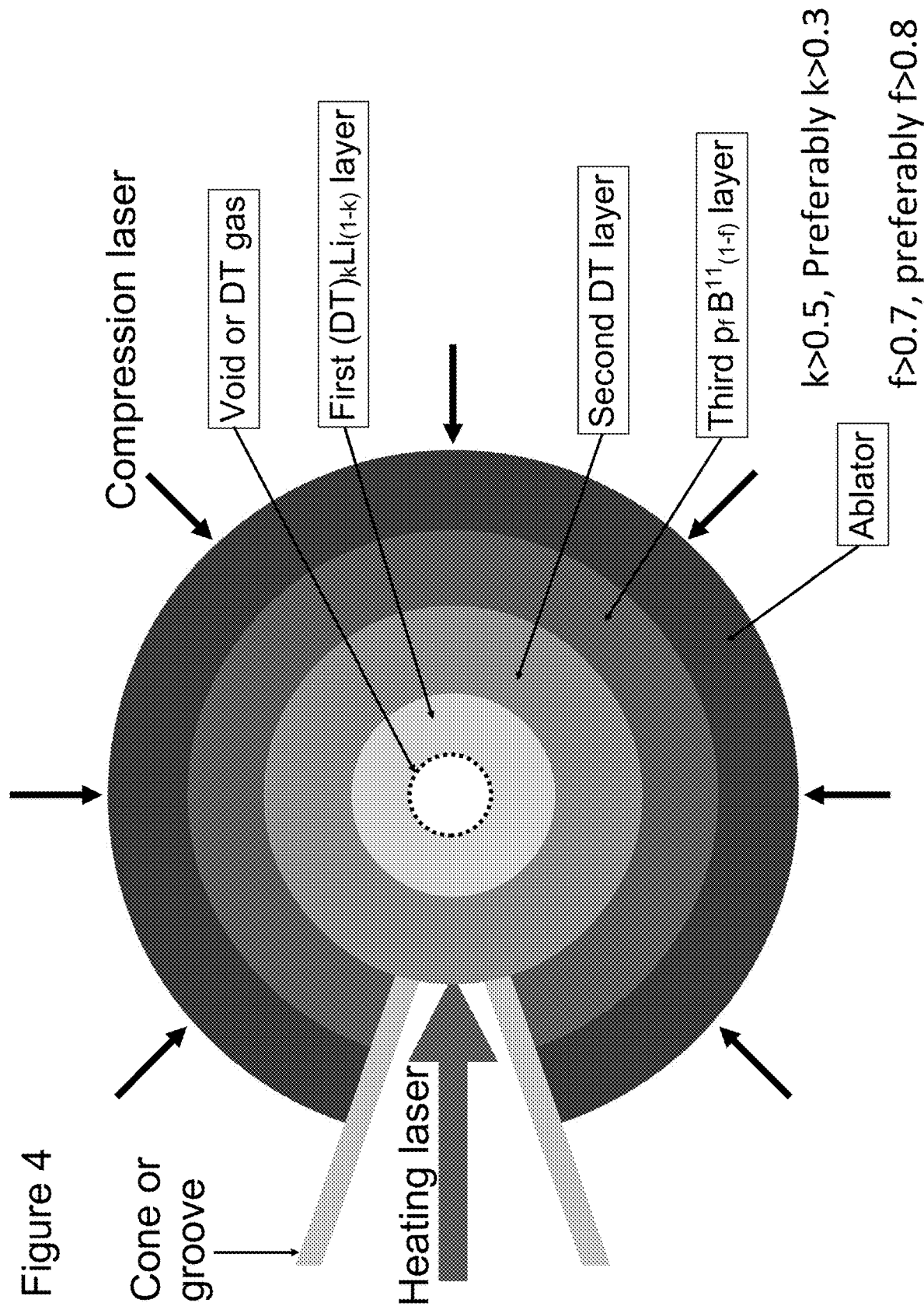
FIG. 4 is a simplified diagram illustrating an alternative target according to an example of the present invention.

As alternative target configurations, FIG. 3 shows the first layer DT and the second layer DTLi in FIG. 1 swapped. Similarly, FIG. 4 shows the first layer DT and the second layer DTLi in FIG. 2 swapped. By swapping the first and second layers, the DT layer is sandwiched between the first and third layers. This target structure has two advantages. First, when fabricating the DT layer, if D or T ions are introduced from the outside toward the inside of the target by ion implantation or diffusion method under the applied high-pressure circumstance, it is easier to introduce D or T ions into the region between the solid first layer DT and the third layer. In addition, in this target configuration, the DT fuel in the second layer first causes fusion ignition and burning. This releases fusion energy, which compresses and heats the DTLi layer inside the DT layer, making DTLi possible to achieve fusion ignition and burning. In addition, in this target arrangement, the tip of the cone target or groove is set to reach the DT fuel in the second layer. After compressing the entire target by the compression laser pulse, the heating laser is irradiated to the DT fuel in the second layer through the cone target or groove, and the DT layer ignites and burns. After that, the DTLi in the first layer ignites and burns. In the case of FIG. 4, the pB$^{11}$ fusion reaction also occurs in the third layer.

Above examples of FIGS. 1-4, when any kind of material is inserted between each fusion material region or between the fusion material region and ablation material should belong to the current invention because those inserted materials do not change the present invention concept. In addition, for both the DTLi layer and the pB$^{10\&11}$ layer, the ratio of DT to Li and the ratio of p to B$^{10\&11}$ can be changed. The ratios of the Li isotopes Li$^6$ and Li$^7$, and the B isotopes B$^{10}$ and B$^{11}$ can also be changed. Changing these isotope ratios requires an isotope enrichment process that is costly, so natural Li and B can be used without enriching these isotopes. In this case, natural lithium Li contains 7.5% Li$^6$ and 92.5% Li$^7$. Natural Boron B contains 19.9% B$^{10}$ and 80.1% B$^{11}$. The actual target material can be selected from this wide range of isotope variations. Even if there are variations in the atomic ratio and isotope ratio, it is not an essential change to our invention, and materials with any ratios belong in the present invention.

The timing between irradiation of sub-nanosecond, picosecond, or femtosecond laser light source and the nanosecond pulse laser light source is: sub-nanosecond, picosecond, or femtosecond laser light sources output a sub-nanosecond, picosecond, or femtosecond pulse focused to the cone-shaped groove on the target with a total peak pulsed power density of $1\times10^{17}$ W/cm$^2$~$1\times10^{24}$ W/cm$^2$ while nanosecond pulse with the pulse width of 1 ns~40 ns and the total pulse peak power density of $1\times10^{13}$ W/cm$^2$~$1\times10^{18}$ W/cm$^2$ is irradiated into the target and then the target is compressed at least 100 times to 20,000 times by the laser ablation.

Next, we show the calculations of the process of converting neutron flux into proton-charged particle flux by slowing down fast neutrons in the pB10 and 11 layer and converting the momentum of neutrons into the momentum of protons. Here, we calculate the elastic collision and energy exchange between 14.1 MeV fast neutrons generated by the DT reaction in the pB10 and 11 layer and the protons and boron atoms in the pB10 and 11 layer. This shows that our target configuration can slow down fast neutrons of 14.1 MeV. The calculated results also show that increasing the ratio of protons to boron in the pB10 and 11 layer has a significant effect on slowing down fast neutrons.

We consider elastic collisions between incident neutrons and background pB$^{11}$ ions with various $p_fB_{(1-f)}$ fractions using the continuous deceleration model. Here, f is the fraction of proton in pB$^{11}$ and ranges from 0 to 1. The probability that a neutron with velocity v (cm/s) is elastically scattered into a solid angle $d\Omega$ (sr) by background $p_fB_{(1-f)}$ ions with number density $n_i$ (cm$^{-3}$) at rest, during time $\delta t$ (s) is given by where $$v\, n_i \frac{d\sigma}{d\Omega} d\Omega\, \delta t,$$

is $$\frac{d\sigma}{d\Omega}$$

the differential scattering cross-section, and we got the values from JENDL-5 which is a nuclear cross-section data in the calculations.

$$\frac{d\sigma}{d\Omega} = \frac{\sigma(E)}{2\pi} f(\mu, E)\ (\text{cm}^2/\text{sr})$$

Here, $\sigma(E)$ is the scattering cross-section (cm$^2$) and $f(\mu, E)$ is the probability density function of the scattering angle cosine. $\mu$ and E are the cosine of the scattering angle in the center-of-mass system and the neutron energy in the system where the target nucleus is at rest, respectively. Multiplying by the energy change $\delta E$ (MeV) of the neutron due to a single scattering and integrating over the entire solid angle gives the energy change of the neutron over time $\delta t$ due to scattering with background ions. Dividing this by time $\delta t$ gives the rate of energy change per unit time due to elastic scattering with background ions $$\left(\frac{dE}{dt}\right)_i,$$

as $$\left(\frac{dE}{dt}\right)_i = \int_{4\pi} d\Omega \, v \, n_i \frac{d\sigma}{d\Omega} \delta E \text{(MeV/s)}$$

The stopping power $S_i(E)$ of the background ions for neutrons with energy E that is the energy lost by the neutron due to elastic collisions per unit length traveled is given by:

$$S_i(E) = -\left(\frac{dE}{dx}\right)_i = -\frac{1}{v}\left(\frac{dE}{dt}\right)_i = -\frac{1}{v}\int_{4\pi} d\Omega \left(v n_i \frac{d\sigma}{d\Omega}\right) \delta E$$

After some transformation of this equation, the stopping power becomes:

$$\left(\frac{dE}{dx}\right)_i = \frac{2\pi}{v} \int_{-1}^{1} d\mu \left(v n_i \frac{d\sigma}{d\Omega}\right) \delta E$$
$$= \frac{2\pi}{v} \int_{-1}^{1} d\mu \left[v n_i \frac{\sigma(E)}{2\pi} f(\mu, E)\right] \left[-\frac{2A}{(1+A)^2}(1-\mu)E\right]$$
$$= -n_i \sigma(E) \frac{2A}{(1+A)^2} E \int_{-1}^{1} [f(\mu, E)(1-\mu)] d\mu$$

Here, A is defined as the mass of the background ion relative to the mass of the neutron, A=(background ion mass)/(neutron mass).

In the above equation, we set the energy change $\delta E$ (MeV) of the neutron due to a single scattering as, $$\delta E = -\frac{2A}{(1+A)^2}(1-\mu)E.$$

Figure 5:
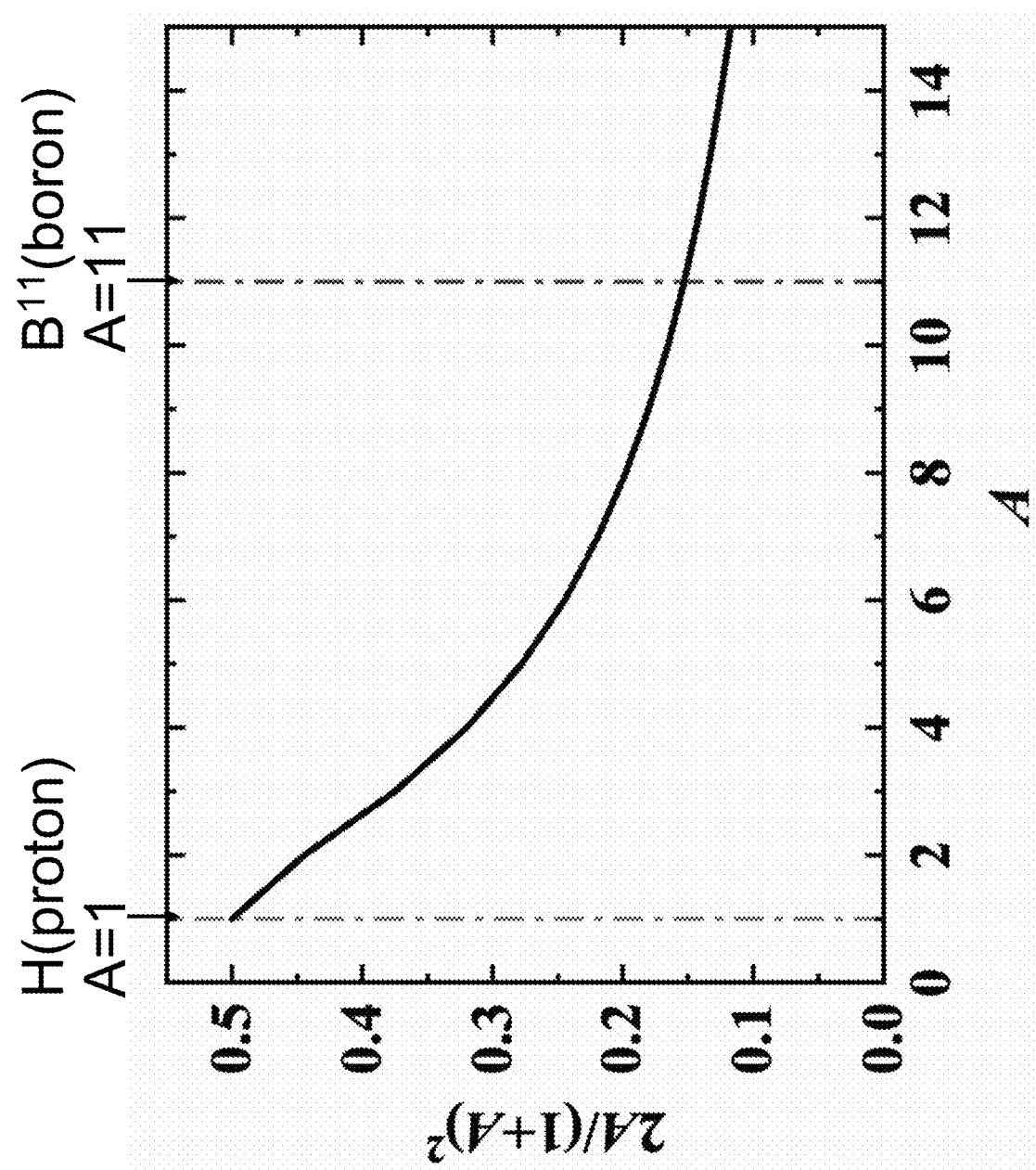
FIG. 5 is a simplified illustration of neutron kinetic energy that decreases in elastic scattering with a proton that has almost the same mass as the neutron in an example of the present invention.

Here, $\delta E$ (MeV) indicates the change in neutron kinetic energy per collision, and $\mu$ is given by $\mu = \cos\theta$, where $\theta$ is the deflection angle at the collision in the frame of the center of mass. The factor $$\frac{2A}{(1+A)^2}$$

in this equation indicates that the magnitude of the change in neutron kinetic energy per collision varies depending on the mass ratio of the background atoms that scatter the neutrons to the neutrons themselves. This factor is shown in FIG. 5. Here, A is the ratio of the atomic mass of the collision partner to the neutron mass, but since the mass of a neutron is almost identical to the atomic mass unit and the mass of a proton when the collision partner is a proton, A=1. On the other hand, when a neutron collides with boron, A=11.

As we see in FIG. 5, the neutron kinetic energy decreases in one elastic scattering with a proton that has almost the same mass as the neutron in an example of the present invention. On the other hand, in a collision with boron, which has a large mass ratio, the decrease in the kinetic energy of neutrons remains relatively small. From this calculation, we learned that a higher proportion of H is more effective as the third layer in our target design from the perspective of slowing down neutrons.

If multiple ion species j are present, the stopping power for each ion species j is calculated and summed over all ion species.

$$S_i(E) = -\left(\frac{dE}{dx}\right)_i = -\sum_j \left(\frac{dE}{dx}\right)_j \text{(MeV/cm)}$$

Here, j is the subscript representing the ion species. The stopping power divided by the mass density of the medium is called the mass stopping power, which is sometimes simply referred to as the stopping power.

$$\frac{S_i(E)}{\rho} = -\frac{1}{\rho}\left(\frac{dE}{dx}\right)_i = -\frac{1}{\rho}\sum_j \left(\frac{dE}{dx}\right)_j \text{(MeV cm}^2\text{/g)}$$

We used JENDL-5 data for the scattering cross-section $\sigma(E)$ and the probability density function of the scattering angle $f(E,\mu)$, and calculated the following integral numerically for a $pB^{11}$ target with the density of $\rho=1000$ g/cm$^3$ and the proton composition fraction of f in $p_fB_{(1-f)}$ as a parameter.

$$\rho x = \int_0^{\rho x} d(\rho x') = \int_{E_0}^{E(\rho x)} \frac{dE}{\frac{dE}{d(\rho x)}} = \int_{E_0}^{E(\rho x)} \frac{\rho dE}{-S_i(E)} = \rho \int_{E(\rho x)}^{E_0} \frac{dE}{S_i(E)} \text{(g/cm}^2\text{)}$$

Here, $E_0$=14.1 MeV is the initial neutron energy, corresponding to $E(\rho x=0)$, and $E(\rho x)$ is the neutron energy after passing through the $pB^{11}$ layer with areal density of $\rho x$ (g/cm$^2$). In the integration of the above integral, we can evaluate the slowing down of the incident neutron energy from the initial energy of 14.1 MeV which corresponds to the neutron energy emitted from the DT fusion reaction of D+T→$^4$He(3.5 MeV)+neutron (14.1 MeV).

Figure 6:
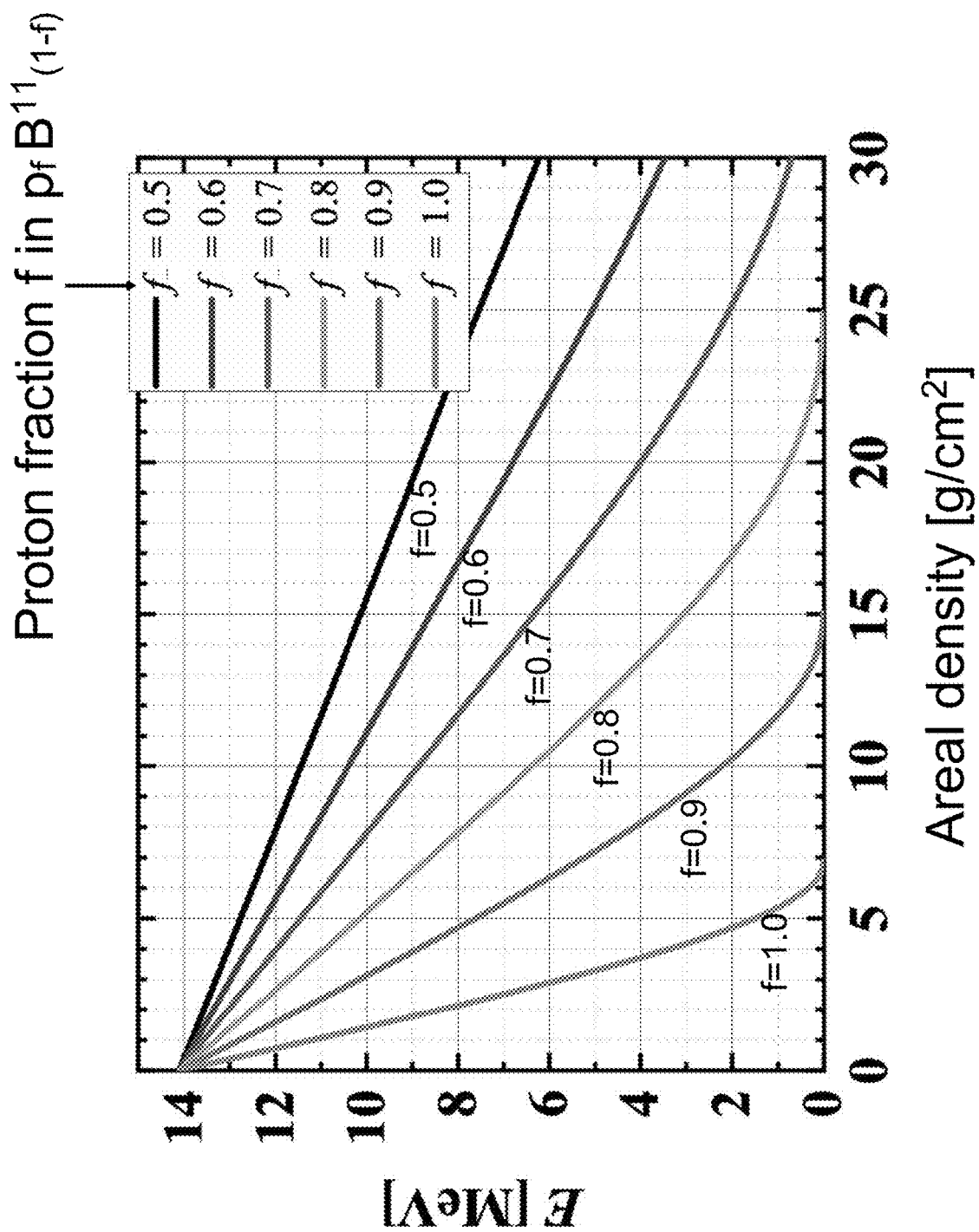
FIG. 6 is a simplified illustration that shows a neutron energy after slowing down during passing through the $pB^{11}$ region while colliding in terms of the areal density $\rho x$ of $pB^{11}$ that neutrons passed through according to an example of the present invention.

FIG. 6 is a simplified illustration that shows a neutron energy after slowing down during passing through the $pB^{11}$ region while colliding in terms of the areal density $\rho x$ of $pB^{11}$ that neutrons passed through according to an example of the present invention. Here, f was changed from 0.5 to 1.0 as $p_fB^{11}(1-f)$. The larger f is, the more proton-rich the $pB^{11}$ fuel is, and f=1.0 corresponds to the $H_2$ layer. This figure shows that if there is a $pB^{11}$ layer with a surface density of 5 g/cm$^2$, the neutrons with an initial energy of 14.1 MeV are slowed down to about 1/10, or about 1.5 MeV, and its energy difference of the neutrons is transferred to protons. In addition, when comparing f=0.9 and f=1.0 at the same surface density of 5 g/cm$^2$, the neutrons are only slowed down to about 7.5 MeV in the case of f=0.9. Therefore, by selecting a complete hydrogen $H_2$ with f=1.0 as the third layer in our target configuration, it is possible to cause significant neutron slowdown and energy change from neutrons to protons. For the usage of the proton-rich $pB^{11}$ layer as the third layer, the proton fraction should be increased as much as possible. Considering about the significant neutron energy reduction at a low surface density of 5 g/cm$^2$, hydrogen is the best to remove the high energy neutrons.

Figure 7:
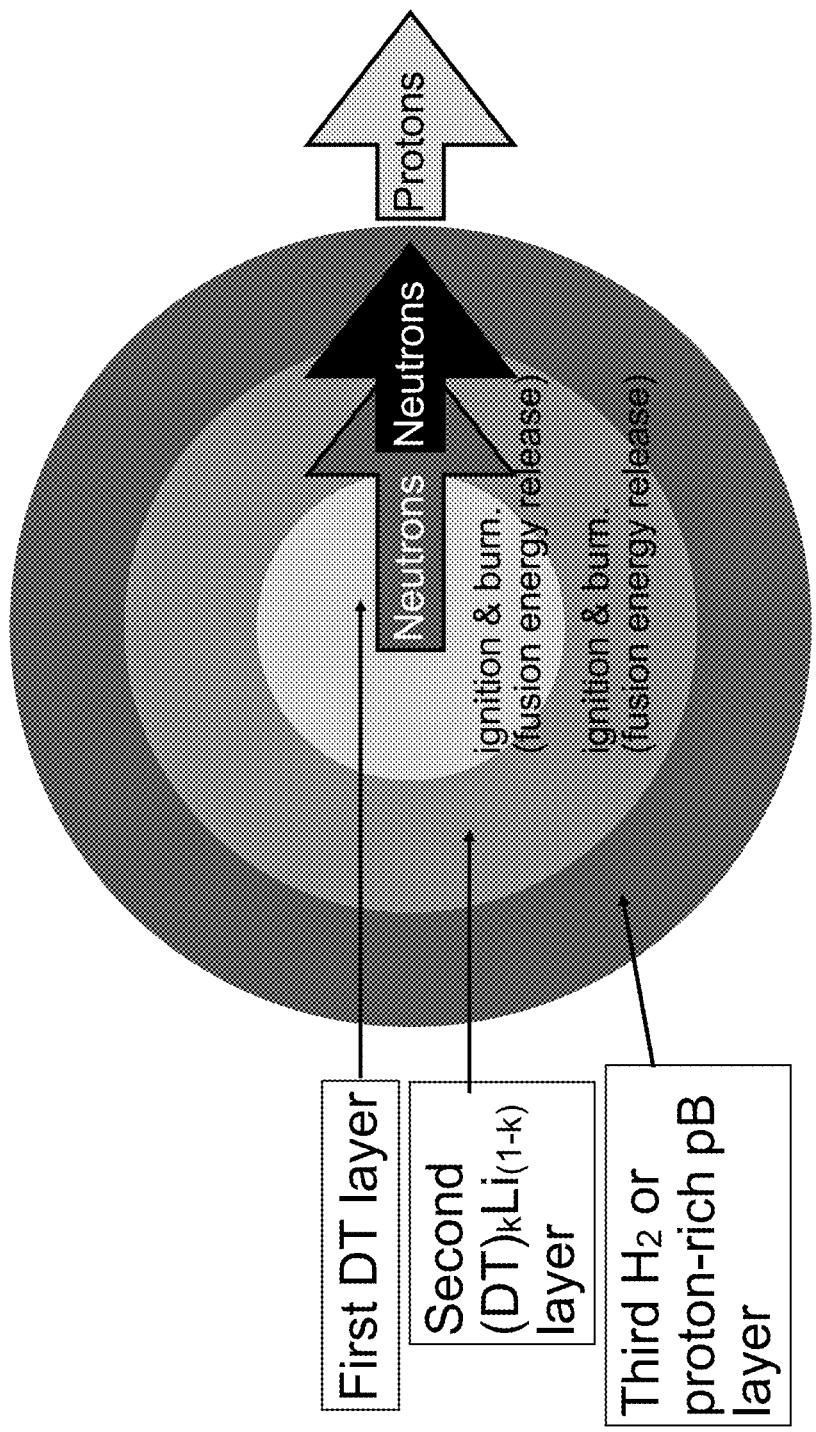
FIG. 7 is a simplified illustration that shows an image of the high fusion gain and the reduction of fast neutron emission outside the target by slowing down neutrons in our target design according to an example of the present invention.

FIG. 7 is a simplified illustration that shows an image of the high fusion gain and the reduction of fast neutron emission outside the target by slowing down neutrons in our target design according to an example of the present invention. Its target profile corresponds to that at the timing of the fusion ignition and burn. In our target design, the fusion energy with target gain G exceeding 100 is mainly released in the first layer DT and the second layer DTLi. In this case, a surface density of 0.3 g/cm$^2$ is desired at least to ignite fusion in the first layer DT. In addition, to aim for a target gain of 100, the surface density of the second layer DTLi should be on the order of 4 g/cm². Furthermore, to sufficiently slow down neutrons and transfer their energy to protons, the surface density of the third layer $H_2$ or proton-rich $pB^{11}$ layer should be about 5 g/cm² as we calculated above. Thus, the total areal density of all layers requires a target with a surface density of 9.3 g/cm² (=0.3+4.0+5.0). However, the first layer DT and the second layer DTLi also slow down fast neutrons and reduce their energy due to the D and T contained in them. In these layers, the energy given from neutrons to D and T helps promote fusion ignition and burn. In FIG. 6, we only considered the moderation by $p_yB_{(1-y)}$ in the third layer, but if the contributions of neutrons in the first and second layers are also taken into account, it is thought that the areal density of the third layer desired to moderate neutrons and the areal density of the entire target can be made smaller than the estimated 9.3 g/cm².

Furthermore, only elastic collisions were considered in FIG. 6, and in fact, when a 14.1 MeV neutron flies through a target, inelastic collisions also occur when it collides with each of the D, T, Li, and B atoms, but these effects are not taken into account in FIG. 6. Therefore, the actual deceleration of fast neutrons involves inelastic collision processes, and the neutron kinetic energy is decelerated even faster than estimated in FIG. 6 as the areal density increases. For this reason, the value of the areal density of 9.3 g/cm² desired for the high target gain and deceleration of fast neutrons estimated above is further reduced.

Figure 8:
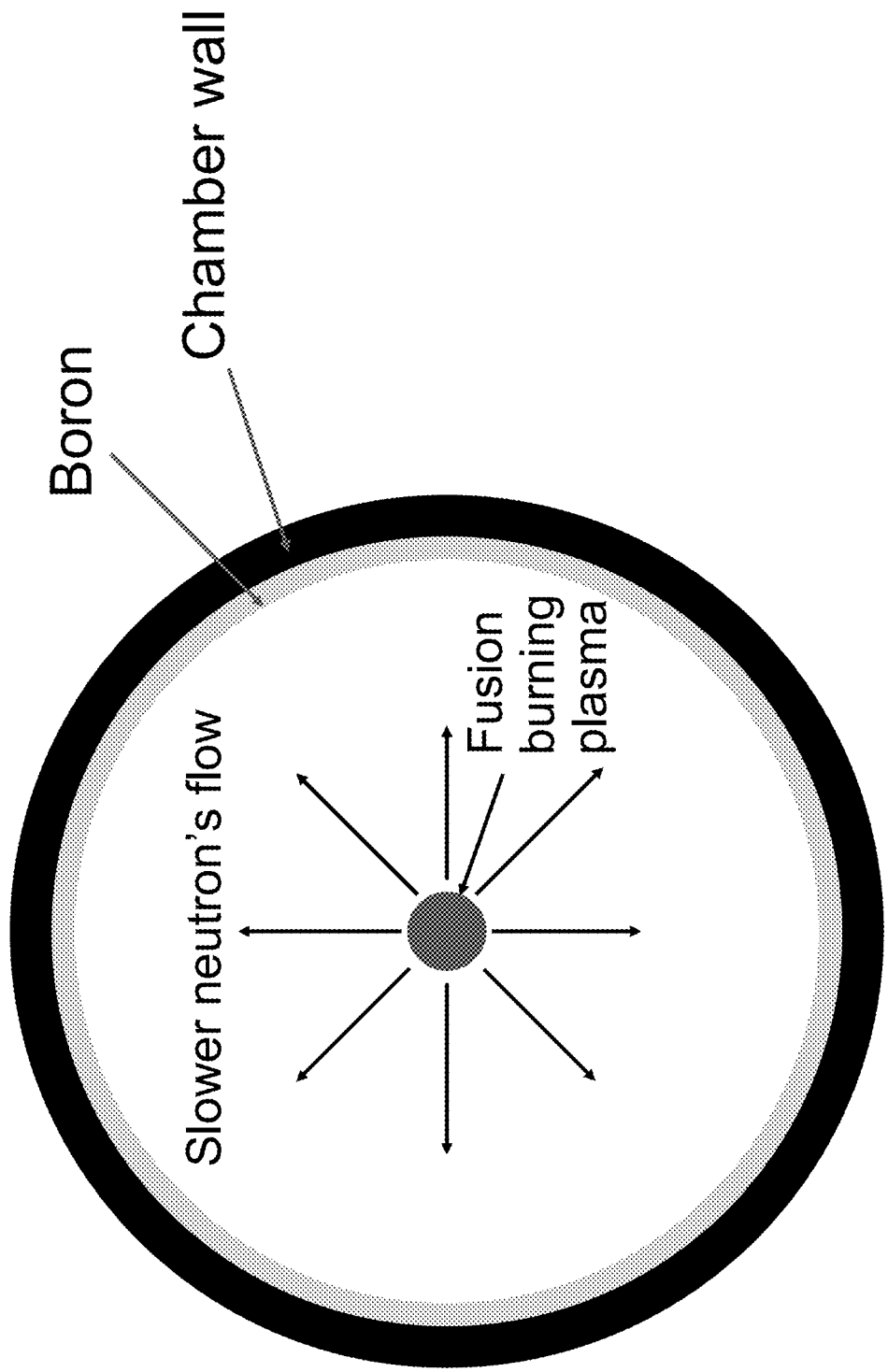
FIG. 8 is a simplified illustration of a reactor system according to an example of the present invention.

Neutrons will continue to exist even if they are slowed down to 1 MeV or less unless they are absorbed or captured by atoms in a neutron capture reaction, and so will be emitted outside the target. However, neutrons slowed down to 1 MeV or less are significantly less likely to activate materials than the original 14.1 MeV fast neutrons, and can be captured and absorbed relatively easily by boron, water inside of a water jacket or other materials settled on the inner wall of the laser fusion chamber as shown in FIG. 8. Therefore, reducing the energy of neutrons is more important than reducing the number of neutrons to reduce damage and radioactivity of the plasma-facing materials in the reactor caused by neutrons. Our target configuration makes it possible to slow down fast neutrons. In addition, the energy of DT neutrons, the main part of the fusion energy generated in DT fusion reactions, can be converted into proton energy, making it easier to control particles inside the fusion reactor than neutrons. It also paves the way for direct power generation using charged protons. This will enable the fusion energy generated by laser fusion to be converted into electricity highly efficiently, leading to a longer life for laser fusion reactors, easier maintenance, and easier management after decommissioning.

In an example, the present invention provides a fuel target device, in an example, for an inertial confinement fusion process, among others, e.g., magnetic. In an example, the device has a center region comprising a deuterium and tritium (DT) containing fuel. The device has a deuterium-tritium-lithium $((DT)_{(1-x)}Li_x, 0 \leq x<0.5)$ containing fuel surrounding the center region and a pure hydrogen ($H_2$) or a proton rich boron $(p_yB_{(1-y)}{}^{11}, 1 \geq y>0.5)$ containing material surrounding the deuterium-tritium-lithium containing fuel. As used herein, the term "pure" means essentially all or up to a practical percentage of purity, e.g., 99.9%, 99.99%, 99.999%, 99.9999%.

In an example, the center region comprises a void region. In an example, the center region of DT fuel can be a state of either a gas, a liquid, and/or a solid phase. In an example, the device has a solid DT is surrounding the center region. In an example, the pure solid hydrogen is surrounding the solid DT. In an example, the pure hydrogen ($H_2$) or proton rich boron $(p_yB_{(1-y)}{}^{11}, 1 \geq y>0.5)$ is surrounded by an ablation material.

In an example, the present invention provides an alternative fuel target device for an inertial confinement fusion process, among others. In an example, the device has a center region is comprising a deuterium-tritium-lithium $((DT)_{(1-x)}Li_x, 0 \leq x<0.5)$ fuel characterized by a higher or equal ignition temperature in comparison with a lowest ignition temperature of deuterium-tritium (DT). The device has a second fuel of deuterium-tritium (DT) fuel characterized by the lowest ignition temperature is surrounding the center fuel and a third outer region of a pure hydrogen ($H_2$) or proton rich boron $(p_yB_{(1-y)}{}^{11}, 1 \geq y>0.5)$ material is surrounding the deuterium-tritium (DT) fuel such that the deuterium-tritium (DT) fuel is sandwiched between the deuterium-tritium-lithium $((DT)_{(1-x)}Li_x, 0 \leq x<0.5)$ fuel and the pure hydrogen or proton rich boron $(p_yB_{(1-y)}{}^{11}, 1 \geq y>0.5)$ material.

In an example, the device has a void region configured within a center of the deuterium-tritium-lithium $((DT)_{(1-x)}Li_x, 0 \leq x<0.5)$ fuel. In an example, the pure hydrogen ($H_2$) or proton rich boron $(p_yB_{(1-y)}{}^{11}, 1 \geq y>0.5)$ is surrounded by an ablation material. In an example, the pure hydrogen is a solid at room temperature before increasing a temperature for a nuclear fusion reaction. In an example, the central region of DT fuel can be a state of either a gas, a liquid, and/or a solid phase. In an example, the $((DT)_{(1-x)}Li_x, 0 \leq x<0.5)$ fuel is in a solid state at a room temperature before increasing a temperature. In an example, the pure hydrogen $H_2$ can be a liquid and a solid phase at a cryogenic temperature of lower than 20K (Kelvin) before increasing a temperature. In an example, the $(p_yB_{(1-y)}{}^{11}, 1 \geq y>0.5)$ material in solid, maintained at room temperature before increasing a temperature. In an example, the proton boron $(p_yB_{(1-y)}{}^{11}, 1 \geq y>0.5)$ has a proton to boron mole ratio of more than 50% fabricated by an ion implantation or an ion diffusion of at least D or T under an applied pressure and a temperature. In an example, the $((DT)_{(1-x)}Li_x, 0 \leq x<0.5)$ fuel in a solid state at a room temperature before increasing a temperature. In an example, the DT material is in a liquid and a solid phase before increasing a temperature.

In an example, the present invention provides a method for generating energy using a target for inertial confinement fusion (ICF). The method includes irradiating a target comprising an outer region of a pure hydrogen and the ablation material with a nanosecond laser pulse to compress the target and irradiating the compressed target with a sub-nanosecond, picosecond, or femtosecond laser pulse to ignite the DT plasma such that a neutron flux with an energy of 14.1 MeV generated by a deuterium or tritium fusion is converted into a proton flow by the outer region of protons (hydrogens), reducing an neutron energy.

In an example, the target is irradiated using the nanosecond pulse with a pulse width of 1 ns~40 ns and a total pulse power density of $1 \times 10^{13}$ W/cm²~$1 \times 10^{18}$ W/cm² and then the target is compressed at least 100 times to 20,000 times by a laser ablation. In an example, the target is irradiated using the picosecond or femtosecond laser pulse that outputs the picosecond or femtosecond pulse focused on the target with a spot size of 5 microns~50 microns and a total peak pulsed power density of $1 \times 10^{17}$ W/cm²~$1 \times 10^{24}$ W/cm². In an example, the outer region comprises a proton-enhanced boron ($pB^{11}$) outer layer provided by ion implantation. In an example, the method includes capturing one or more neutrons in a fusion reactor system by an inner surface comprising a boron capable of capturing the neutrons. In an example, the target is provided in a laser induced magnetized liner inertial fusion (MagLIF) configured with a total pulsed laser energy of more than 0.5 MJ with a pulse width of 5 ns~50 ns into a capacitor coupled to a cylindrical shaped target container comprising the target. In an example, the third outer material of ($p_y B_{(1-y)}{}^{11}$, $1 \geq y > 0.5$) surrounding the second fuel is configured into the cylindrical shaped target container; such that a neutron flux with an energy of 14.1 MeV generated by a deuterium or tritium fusion is converted into a proton flow by the third outer material, reducing an neutron energy. In an example, the center DT fuel is heated by irradiation of lasers for preheating.

In an example, the target materials and structures can be applied to a laser induced magnetized liner inertial fusion (MagLIF) or conventional Mag-LIF which use a cylinder-shaped target container to contain the target materials. An example of the MagLIF is described in U.S. patent application Ser. No. 18/734,986 Filed: Jun. 5, 2024 and titled LASER INDUCED MAGNETIZED LINER INERTIAL FUSION SYSTEM AND METHOD, which is commonly assigned, and hereby incorporated by reference for all purposes. The cylinder-shaped target container is compressed by a strong magnet field generated by a high current flow along the liner of sidewall of the cylinder-shaped target container. Thus, the laser ablation material is not desired for the laser induced or conventional MagLIF. Other material and the target structure are the same. For example, of claim 1, the center region is composed of cylinder-shaped DT fuel gas as a first layer; a second outer region surrounding the first layer and comprising a cylinder-shaped deuterium-tritium-lithium (($DT)_{(1-x)} Li_x$, $0 \leq x < 0.5$); a third outer region surrounding the second outer region and comprised of a cylinder-shaped pure hydrogen ($H_2$) or proton rich boron ($p_y B_{(1-y)}{}^{11}$, $1 \geq y > 0.5$). The first and second layers are contained inside of the cylinder-shaped target container. The third layer is added when the high energy neutrons are removed by proton collisions.

Further details of an optical enhancement cavity using a Fabry Perot cavity is found in a patent application titled "A FAST IGNITION FUSION SYSTEM AND METHOD," in the names of Shuji Nakamura and Hiroaki Ohta listed under U.S. Ser. No. 18/319,368 filed May 17, 2023, commonly assigned, and hereby incorporated by reference in their entirety.

While the above is a full description of the specific examples, various modifications, alternative constructions and equivalents may be used. As an example, the packaged device can include any combination of elements described above, as well as outside of the present specification. In an example, the terms "first" "second" "third" "fourth" and others do not imply order. Therefore, the above description and illustrations should not be taken as limiting the scope of the present invention which is defined by the appended claims.

The invention claimed is:

1. A fuel target device for an inertial confinement fusion process, the device comprising:
    a center region is comprising a first fuel layer of deuterium-tritium-lithium (($DT)_{(1-x)} Li_x$, $0 \leq x < 0.5$) fuel characterized by a higher or equal ignition temperature in comparison with a lowest ignition temperature of deuterium-tritium (DT);
    a second fuel layer of deuterium-tritium (DT) fuel-characterized by the lowest ignition temperature is surrounding the center-region; and
    a third fuel layer comprising an outer region of a pure hydrogen ($H_2$) or a proton rich boron ($p_y B_{(1-y)}{}^{11}$, $1 \geq y > 0.5$) material is surrounding the deuterium-tritium (DT) fuel such that the deuterium-tritium (DT) fuel is sandwiched between the deuterium-tritium-lithium (($DT)_{(1-x)} Li_x$, $0 \leq x < 0.5$) fuel and the pure hydrogen or proton rich boron ($p_y B_{(1-y)}{}^{11}$, $1 \geq y > 0.5$) material.

2. The device of claim 1 further comprising a void region configured within a center of the deuterium-tritium-lithium (($DT)_{(1-x)} Li_x$, $0 \leq x < 0.5$) fuel.

3. The device of claim 1 wherein the pure hydrogen ($H_2$) or proton rich boron ($p_y B_{(1-y)}{}^{11}$, $1 \geq y > 0.5$) is surrounded by an ablation material.

4. The device of claim 1 wherein the outer region comprises the pure hydrogen and wherein the pure hydrogen (H2) is a solid at room temperature.

5. The device of claim 1 wherein at least some of the center region of DT fuel can be in a state of either a gas, a liquid, or a solid phase.

6. The device of claim 1 wherein the deuterium-tritium-lithium (($DT)_{(1-x)} Li_x$, $0 \leq x < 0.5$) fuel is in a solid state at a room temperature before increasing a temperature in a nuclear fusion reaction.

7. The device of claim 1 wherein the pure hydrogen $H_2$ or the proton rich boron material can be a liquid or a solid phase at a cryogenic temperature of lower than 20K before increasing a temperature in a nuclear fusion reaction.

8. The device of claim 1 wherein the outer region comprises the proton rich boron; and wherein the proton rich boron ($p_y B_{(1-y)}{}^{11}$, $1 \geq y > 0.5$) material is a solid at room temperature.

9. The device of claim 1 wherein the outer region comprises the proton boron; and wherein the proton boron ($p_y B_{(1-y)}{}^{11}$, $1 \geq y > 0.5$) has a proton to boron mole ratio of more than 50% fabricated by an ion implantation or an ion diffusion of at least D or T under an applied pressure and a temperature.

10. The device of claim 1 wherein at least some of the DT material is in a liquid phase or a solid phase before increasing a temperature in a nuclear fusion reaction.

* * * * *